(12) United States Patent
Hwang et al.

(10) Patent No.: US 11,580,376 B2
(45) Date of Patent: Feb. 14, 2023

(54) ELECTRONIC APPARATUS AND METHOD FOR OPTIMIZING TRAINED MODEL

(71) Applicant: Korea Advanced Institute of Science and Technology, Daejeon (KR)

(72) Inventors: Sungju Hwang, Daejeon (KR); Gunhee Kim, Seoul (KR); Juyong Kim, Jinju-si (KR); Yookoon Park, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1288 days.

(21) Appl. No.: 16/002,649

(22) Filed: Jun. 7, 2018

(65) Prior Publication Data

US 2018/0357540 A1     Dec. 13, 2018

Related U.S. Application Data

(60) Provisional application No. 62/517,442, filed on Jun. 9, 2017.

(30) Foreign Application Priority Data

Jan. 29, 2018     (KR) .......................... 10-2018-0010938

(51) Int. Cl.
*G06N 3/08*     (2006.01)
*G06N 3/04*     (2006.01)
(Continued)

(52) U.S. Cl.
CPC .............. *G06N 3/08* (2013.01); *G06F 17/16* (2013.01); *G06K 9/627* (2013.01); *G06K 9/6262* (2013.01);
(Continued)

(58) Field of Classification Search
CPC ...... G06N 3/08; G06N 3/0454; G06N 3/0472; G06N 3/063; G06V 30/194; G06F 17/16; G06K 9/6262; G06K 9/627; G06K 9/6271
See application file for complete search history.

(56) References Cited

U.S. PATENT DOCUMENTS

2015/0324684 A1*  11/2015  Alvarez-Icaza Rivera ..................
                                                G06N 3/04
                                                706/26
2017/0185585 A1*  6/2017   Applegate .............. G06N 3/088
(Continued)

FOREIGN PATENT DOCUMENTS

JP     2001-142867 A     5/2001
JP     4451624 B2        4/2010
(Continued)

OTHER PUBLICATIONS

Scardapane et al., "Group Sparse Regularization for Deep Neural Networks," arXiv:1607.00485v1 [stat.ML] Jul. 2, 2016. (Year: 2016 ).*
(Continued)

*Primary Examiner* — Miranda M Huang
*Assistant Examiner* — Yao David Huang
(74) *Attorney, Agent, or Firm* — Jefferson IP Law, LLP

(57) ABSTRACT

An electronic apparatus is provided. The electronic apparatus includes: a memory storing a trained model including a plurality of layers; and a processor initializing a parameter matrix and a plurality of split variables of a trained model, calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables, vertically
(Continued)

splitting the plurality of layers according to the group based on the computed split parameters and reconstruct the trained model using the computed new parameter matrix as parameters of the vertically split layers.

10 Claims, 17 Drawing Sheets

(51) Int. Cl.
    *G06K 9/62*     (2022.01)
    *G06F 17/16*     (2006.01)
    *G06N 3/063*     (2006.01)
    *G06V 30/194*     (2022.01)

(52) U.S. Cl.
    CPC ......... *G06K 9/6271* (2013.01); *G06N 3/0454* (2013.01); *G06N 3/0472* (2013.01); *G06N 3/063* (2013.01); *G06V 30/194* (2022.01)

(56) References Cited

U.S. PATENT DOCUMENTS

2018/0268284 A1   9/2018   Ren et al.
2020/0026992 A1*  1/2020   Zhang ................ G06N 3/0454
2021/0295166 A1*  9/2021   Rouhani ............. G06N 3/084

FOREIGN PATENT DOCUMENTS

KR   10-2016-0059265 A   5/2016
KR   10-2018-0105556 A   9/2018

OTHER PUBLICATIONS

Mao et al., "MoDNN: Local distributed mobile computing system for Deep Neural Network," Design, Automation & Test in Europe Conference & Exhibition (DATE), 2017, Mar. 27-31, 2017, pp. 1396-1401 (Year: 2017).*

Wen et al., "Learning Structured Sparsity in Deep Neural Networks," arXiv:1608.03665v4 [cs.NE] Oct. 18, 2016 (Year: 2016).*

Alex Nowak et al., Divide and Conquer With Neural Networks, Under review as a conference paper at ICLR2017.

Mike Wynne-Jones, Node Splitting: A Constructive Algorithm for Feed-Forward Neural Networks, 1993.

Korean Notice of Allowance dated Apr. 26, 2020, issued in Korean Application No. 10-2018-0010938.

* cited by examiner

FIG. 7

Algorithm 1 Splitting Deep Neural Networks

Input: Number of groups G, layers to split $S \leq L$ and hyper-paramaters $\gamma_1, \gamma_2, \gamma_3$
Initialize weights and group assignments
while groupings have not converged do
    Optimize the objective using SGD with a learning rate $\eta$ $$\mathcal{L}(\omega, X, Y) + \lambda \sum_{l=1}^{L} \|W\|_2^2 + \gamma_1 \sum_{l=S}^{L} R_W(W^{(l)}, P^{(l)}, Q^{(l)})$$

$$+ \gamma_2 \sum_{l=S}^{L} R_D(P^{(l)}, Q^{(l)}) + \gamma_3 \sum_{l=S}^{L} R_E(P^{(l)}, Q^{(l)})$$

end while
Split the network using the obtained group assignments and weight matrices
while validation accuracy improves do
    Optimize $\mathcal{L}(\omega, X, Y) + \lambda \sum_{l=1}^{L} \|W^{(l)}\|_2^2$ using SGD
end while

FIG. 9

| NETWORK | TIME(S) | % REDUCED | % SPEEDUP |
|---|---|---|---|
| BASELINE | 38.29 | 0.0 | 0.0 |
| SHALLOW SPLIT | 28.35 | 25.96 | 25.96 |
| DEEP SPLIT | 21.38 | 44.16 | 44.16 |
| HIER. SPLIT | 22.87 | 40.27 | 40.27 |

FIG. 11

| METHOD | SPLIT DEPTH | G | SPLIT NET-S | SPLIT NET-C | SPLIT NET-R | SPLIT NET |
|---|---|---|---|---|---|---|
| WRN-16-8 (BASELINE) | | | | | | 24.28 |
| WRN-16-8 (DROPOUT) | | | | | | 24.52 |
| FC SPLIT | 1 | 4 | 23.80 | 23.72 | 24.30 | 24.26 |
| SHALLOW SPLIT | 6 | 2 | 24.46 | 24.54 | 25.46 | 23.96 |
| DEEP SPLIT (DROPOUT) | 11 | 2 | 25.04 | 26.04 | 27.12 | 24.62 |
| HIER. SPLIT (DROPOUT) | 11 | 2-4 | 24.92 | 25.98 | 26.78 | 24.80 |

FIG. 12

| NETWORK | PARAMS($10^6$) | % REDUCED | FLOPS($10^9$) | % REDUCED | TEST ERROR(%) |
|---|---|---|---|---|---|
| WRN-16-8 | 11.0 | 0.0 | 3.09 | 0.0 | 24.28 |
| FC SPLIT | 11.0 | 0.0 | 3.09 | 0.0 | 24.26 |
| SHALLOW SPLIT | 7.42 | 32.44 | 2.64 | 14.65 | 23.96 |
| DEEP SPLIT (DROPOUT) | 5.88 | 46.31 | 2.10 | 32.01 | 24.66 |
| DEEP SPLIT (DROPOUT) | 4.12 | 62.52 | 1.88 | 39.33 | 24.80 |

FIG. 14

| NETWORK | SPLITS | PARAMS($10^6$) | % REDUCED | FLOPS($10^9$) | % REDUCED | TEST ERROR(%) |
|---|---|---|---|---|---|---|
| ALEXNET (BASELINE) | 0 | 62.37 | 0 | 2.278 | 0 | 41.72 |
| SPLITNET | 1-1-3 | 59.64 | 4.38 | 2.273 | 0.21 | 42.07 |
|  | 1-2-5 | 50.69 | 18.72 | 2.256 | 1.00 | 42.21 |
|  | 2-4-8 | 27.34 | 56.17 | 2.209 | 3.05 | 43.02 |
|  | 2 x 5 | 31.96 | 48.76 | 1.847 | 18.95 | 44.60 |
| SPLITNET-R | 1-1-3 | 59.64 | 4.38 | 2.273 | 0.21 | 42.20 |
|  | 1-2-5 | 50.70 | 18.70 | 2.256 | 0.99 | 43.20 |
|  | 2-4-8 | 27.34 | 56.17 | 2.209 | 3.05 | 43.35 |
|  | 2 x 5 | 31.94 | 48.79 | 1.846 | 18.93 | 44.99 |

FIG. 15

| NETWORK | SPLITS | SPLITS DEPTH | PARAMS($10^6$) | % REDUCED | FLOPS($10^9$) | % REDUCED | TEST ERROR(%) |
|---|---|---|---|---|---|---|---|
| RESNET-18 | 0 | 0 | 11.68 | 0 | 3.628 | 0 | 31.73 |
| SPLITNET | 1-1-3 | 1 | 11.34 | 2.92 | 3.627 | 0.02 | 31.93 |
|  | 1-2-4 | 6 | 7.12 | 38.99 | 3.219 | 11.28 | 36.73 |
|  | 2-4-4 | 11 | 3.96 | 66.12 | 2.600 | 28.33 | 40.24 |
| SPLITNET-R | 1-1-3 | 1 | 11.34 | 2.92 | 3.627 | 0.02 | 32.80 |
|  | 1-2-4 | 6 | 7.10 | 39.25 | 3.219 | 11.37 | 38.56 |
|  | 2-4-4 | 11 | 3.95 | 66.12 | 2.600 | 28.35 | 48.51 |

ELECTRONIC APPARATUS AND METHOD FOR OPTIMIZING TRAINED MODEL

CROSS-REFERENCE TO RELATED APPLICATIONS

This application claims priority from Korean Patent Application No. 10-2018-0010938, filed on Jan. 29, 2018 in the Korean Intellectual Property Office and U.S. Provisional Application No. 62/517,442, filed on Jun. 9, 2017, in the USPTO the disclosure of which is incorporated herein by reference in its entirety.

BACKGROUND OF THE INVENTION

Field of the Invention

Apparatuses and methods consistent with the present disclosure relate to an electronic apparatus and a method for optimizing a trained model, and more particularly, to an electronic apparatus and a method for optimizing a trained model capable of optimizing the trained model by automatically dividing each layer in the trained model into semantically related groups and enabling model parallelization.

Description of the Related Art

A deep neural network is one of machine learning technologies that get great improvement in performance in fields such as computer vision, speech recognition, and natural language processing. The deep neural network consists of sequential computations of several layers, such as a complete connection layer and a convolutional layer.

Since each layer represented by a matrix product requires a large amount of computation, the deep neural network requires a large amount of computation and a large-capacity model parameter for learning and execution.

However, when a size of a model or a task, such as classifying tens of thousands of object classes is very large or when a real-time object detection is required, this large amount of computation has become a limitation in utilizing the deep neural network.

Accordingly, conventionally, a method for reducing the number of model parameters or a method for accelerating learning and execution of a model based on data parallelization using distributed machine learning has been used.

However, these methods are to reduce the number of parameters while maintaining a network structure or reduce a computation time by using a large amount of computation devices, and therefore may not improve the essential structure of the deep neural network.

In other words, the conventional deep neural network consists of sequential computations of a single and large layer. When the sequential computations are divided into and performed by a plurality of arithmetic units, a longer temporal bottleneck phenomenon occurs in communication between the arithmetic units. Therefore, there is a limit in that one arithmetic unit cannot but perform a computation on one input.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An object of the present disclosure is to provide an electronic apparatus and a method for optimizing a trained model capable of optimizing the trained model by automatically dividing each layer in the trained model into semantically related groups and enabling model parallelization.

According to an aspect of the present disclosure, a method for optimizing a trained model includes: initializing a parameter matrix and a plurality of split variables of a trained model including a plurality of layers; calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables; and vertically splitting the plurality of layers according to the group based on the computed split parameters and reconstructing the trained model using the computed new parameter matrix as parameters of the vertically split layers.

In the initializing, the parameter matrix may be initialized randomly and the plurality of split variables may be initialized not to be uniform to each other.

In the computing, a stochastic gradient descent method may be used so that the object function is minimized.

The split regularization term may include a group weight regularization term that suppresses an inter-group connection and activates only an intra-group connection, a disjoint group assignment that makes each group be orthogonal to each other, and a balanced group assignment that prevents a size of one group from being excessive.

The method may further include: computing a second-order new parameter matrix for the reconstructed trained model to minimize the loss function for the trained model and a second objective function including only the weight decay regularization, and optimizing the trained model using the computed second-order new parameter matrix as parameters of the vertically split layers.

The method may further include: parallelizing each of the vertically split layers within the optimized trained model using different processors.

According to an aspect of the present disclosure, an electronic apparatus includes: a memory storing a trained model including a plurality of layers; and a processor initializing a parameter matrix and a plurality of split variables of a trained model, calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables, vertically splitting the plurality of layers according to the group based on the computed split parameters and reconstruct the trained model using the computed new parameter matrix as parameters of the vertically split layers.

The processor may randomly initialize the parameter matrix and initialize the plurality of split variables not to be uniform to each other.

The processor may use a stochastic gradient descent method to minimize the objective function.

The split regularization term may include a group weight regularization term that suppresses an inter-group connection and activates only an intra-group connection, a disjoint group assignment that makes each group be orthogonal to each other, and a balanced group assignment that prevents a size of one group from being excessive.

The processor may compute the second-order new parameter matrix for the reconstructed trained model to minimize the loss function for the trained model and a second objective function including only the weight decay regularization, and optimize the trained model using the computed second-order new parameter matrix as parameters of the vertically split layers.

According to an aspect of the present disclosure, there is provided a computer readable recording medium including a program for executing a method for optimizing a trained model in an electronic apparatus, wherein the method for optimizing a trained model includes: initializing a parameter matrix and a plurality of split variables of a trained model including a plurality of layers; calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables; and vertically splitting the plurality of layers according to the group based on the computed split parameters and reconstructing the trained model using the computed new parameter matrix as parameters of the vertically split layers.

As described above, according to the various embodiments of the present disclosure, the layers of the trained model can be automatically divided into several layers, thereby reducing the amount of computation, reducing the number of parameters, and enabling the model parallelization.

Further, the effects that may be obtained or expected by the exemplary embodiments of the present disclosure shall be directly or implicitly disclosed in the detailed description of the present disclosure. For example, various effects that may be expected by the exemplary embodiments of the present disclosure shall be disclosed in the detailed description to be described below.

In addition, the technical problem to be solved in the present disclosure is not limited to the above-mentioned technical problems, and other technical problems can be clearly understood to those skilled in the art to which the present disclosure pertains from the following description.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 7 is a diagram showing an example of a case in which an output of one group is split;

FIG. 9 is a diagram showing a benchmark of a trained model to which an optimization method is applied;

FIG. 11 is a diagram showing test errors for each of the various algorithm schemes for a set of CIFAR-100 data;

FIG. 12 is a diagram showing a comparison of a parameter (or computation) reduction and a test error in the set of CIFAR-100 data;

FIGS. 14 and 15 are diagrams showing a comparison of a parameter (or computation) reduction and a test error in a set of ILSVRC2012 data;

DETAILED DESCRIPTION OF THE EXEMPLARY EMBODIMENTS

Figure 1:
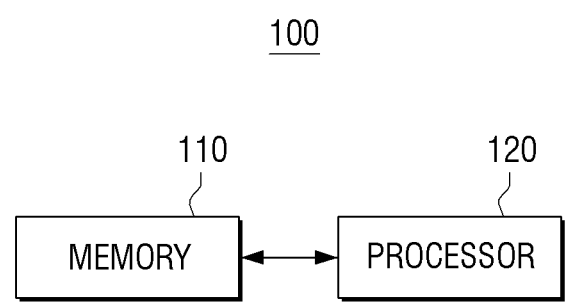
FIG. 1 is a block diagram illustrating a simple configuration of an electronic apparatus according to an embodiment of the present disclosure.

Terms used in the present specification are briefly described and then the present disclosure will be described in detail.

Terms used in embodiments of the present disclosure are selected as general terminologies currently widely used in consideration of the configuration and functions of the present disclosure, but can be different depending on intention of those skilled in the art, a precedent, appearance of new technologies, and the like. Further, in specific cases, terms arbitrarily selected by an applicant are present. In this case, the detailed meaning of the terms will be described in the description of the present disclosure. Therefore, terms used in the present disclosure are defined based on a meaning of the terms and contents described in the present disclosure, not simply based on names of the terms.

The embodiments of the present disclosure may be variously modified and have several forms. Therefore, specific embodiments of the present disclosure will be illustrated in the accompanying drawings and be described in detail in the present specification. However, it is to be understood that the present disclosure is not limited to a specific embodiment, but includes all modifications, equivalents, and substitutions without departing from the scope and spirit of the present disclosure. When it is decided that the detailed description of the known art related to the present disclosure may obscure the gist of the present disclosure, a detailed description therefor will be omitted.

Terms 'first', 'second', and the like, may be used to describe various components, but the components are not to be construed as being limited by the terms. The terms are used to distinguish one component from another component.

Singular forms are intended to include plural forms unless the context clearly indicates otherwise. It will be further understood that the terms "comprises" or "have" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

Hereinafter, embodiments of the present disclosure will be described in detail with reference to the accompanying drawings so that those skilled in the art may easily practice the present disclosure. However, the present disclosure may be modified in various different ways and is not limited to embodiments provided in the present description. In the accompanying drawings, portions unrelated to the description will be omitted in order to obviously describe the present disclosure, and similar reference numerals will be used to describe similar portions throughout the present specification.

Hereinafter, exemplary embodiments of the present disclosure will be described in more detail with reference to the accompanying drawings.

FIG. 1 is a block diagram illustrating a simple configuration of an electronic apparatus according to an embodiment of the present disclosure.

Referring to FIG. 1, the electronic device 100 may be configured to include a memory 110 and a processor 120. Here, the electronic apparatus 100 may be a data computable PC, a notebook PC, a server, or the like.

The memory 110 stores a trained model configured of a plurality of layers. Here, the trained model may be referred to as a network as a trained model using an artificial intelligence algorithm. The artificial intelligence algorithm may be a deep neural network (DNN), a deep convolution neural network, a residual network, or the like.

The memory 110 may store a learning data set for optimizing the trained model, and may store data for classification or recognition using the corresponding trained model.

In addition, the memory 110 may store a program required necessary for optimizing the trained model, or may store the trained model optimized by the corresponding program.

The memory 110 may be implemented in a storage medium in the electronic apparatus 100 and an external storage medium, for example, a removable disk including a USB memory, a storage medium connected to a host, a web server through a network, and the like.

The processor 120 controls each component of the electronic apparatus 100. Specifically, when a boot command is input from the user, the processor 120 may perform booting using an operating system stored in the memory 110.

The processor 120 may select a trained model to be optimized through the operation input 140 which will be described later, and may receive various parameters for optimizing the selected trained model through the operation input 140. Here, the received various parameters may be the number of groups to be split, hyper parameters or the like.

If receiving various kinds of information, the processor 120 may group the received information into a plurality of groups based on input/output features of each layer and reconstruct them as a trained model having a tree structure.

Specifically, the processor 120 may initialize a parameter matrix and a plurality of split variables of the trained model configured of a plurality of layers. Specifically, the processor 120 may randomly initialize the parameter matrix and initialize the plurality of split variables to be close to a uniform value. Herein, the parameter matrix means a parameter matrix of one layer of the trained model, and the plurality of split variables may include a feature-group split variable and a class-group split variable. The plurality of split variables may have a matrix form corresponding to the parameter matrix.

The processor 120 may compute a new parameter matrix having a block-diagonal matrix for the plurality of split variables and the trained model to minimize a loss function for the trained model, a weight decay regularization term, and an objective function including a split regularization term defined by the parameter matrix and the plurality of split variables. At this time, the processor 120 may minimize the objective function by using a stochastic gradient descent method. Here, the objective function is a function for simultaneously optimizing a cross entropy loss and group regularization, and may be expressed by the following Equation 1. Specific contents of the objective function will be described later with reference to FIG. 3.

The processor 120 may vertically split a plurality of layers according to the group based on the computed split parameters and reconstruct the trained model using the computed new parameter matrix as parameters of vertically split layers.

The processor 120 may compute a second-order new parameter matrix for the constructed trained model to minimize the loss function for the trained model and a second objective function including only the weight decay regularization term, and optimize the trained model using the computed second-order new parameter matrix as a parameter of a vertically split layer.

The processor 120 may use the optimized trained model to perform various processes such as vision recognition, speech recognition, and natural language processing. Specifically, if the trained model is related to image classification, the processor 120 may classify what the input image is based on the optimized trained model and the input image.

At this time, the processor 120 may classify the input image using a plurality of processor cores, or may perform the processing together with other electronic apparatuses. Specifically, the trained model optimized by the present disclosure has a vertically split tree structure, so that a computation corresponding to one split group may be computed by one arithmetic unit, and a computation corresponding to other groups may be computed by other arithmetic units.

As described above, the electronic apparatus 100 according to the present embodiment clusters the trained models into groups in which classes match a set of exclusive functions. According to the optimized trained model, a single trained model may be computed by being divided into multiple devices without a bottleneck phenomenon caused by communication, and the number of computation and parameters may be reduced, such that it is possible to perform the computation even faster just by one device. In addition, since the electronic apparatus 100 is fully integrated into the network learning procedure using the objective function as the following Equation 1, the network weight and split may be simultaneously learned.

Meanwhile, it is described with reference to FIG. 1 that the number of split groups is received from the user and the trained model is split into the number of received groups. However, upon the implementation, an operation of finding the optimum number of groups of the trained model using the predetermined algorithm is performed in advance and it is also possible to split the trained models based on the number of groups found.

Meanwhile, only the simple components configuring the electronic apparatus are illustrated and described above, but in the implementation, various components may be additionally provided. This will be described below with reference to FIG. 2.

Figure 2:
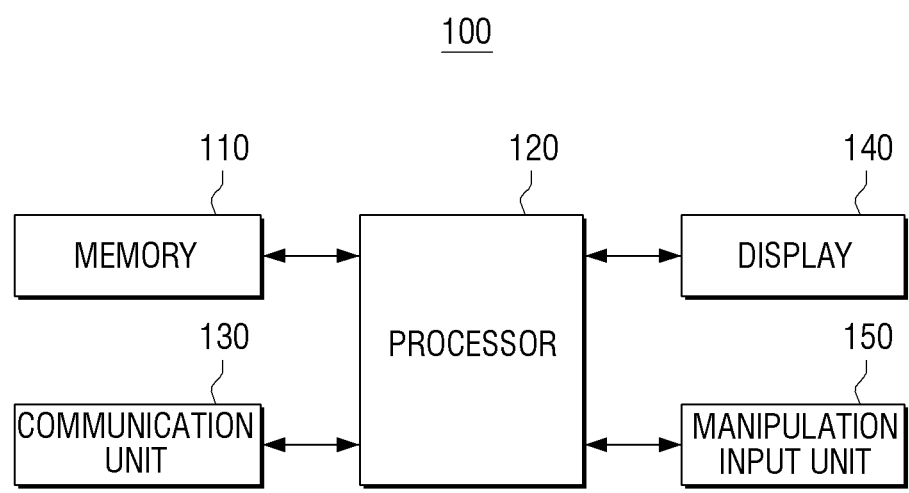
FIG. 2 is a block diagram illustrating a detailed configuration of the electronic apparatus according to the embodiment of the present disclosure.

FIG. 2 is a block diagram illustrating a detailed configuration of the electronic apparatus according to the embodiment of the present disclosure.

Referring to FIG. 2, the electronic apparatus 100 may be configured to include the memory 110, the processor 120, the communication unit 130, a display, 140, and a manipulation input unit 150.

The operations of the memory 110 and the processor 120 have been described with reference to FIG. 1, and a redundant description thereof will be omitted.

The communication unit 130 is connected to other electronic apparatuses and may receive trained models and/or learning data from other electronic apparatus. In addition, the communication unit 130 may transmit data required for distributed computation with other electronic apparatuses to other electronic apparatuses.

Also, the communication unit 130 may receive information for processing using the trained model and provide the processed results to the corresponding apparatus. For example, if the corresponding trained model is a model for classifying an image, the communication unit 130 may receive the image to be classified and transmits information about the classification result to the apparatus for transmitting the image.

The communication unit 130 is configured to connect the electronic apparatus 100 to an external device and can be connected to a terminal device through a local area network (LAN) and an Internet network as well as a universal serial bus (USB) port or wireless communication (for example, WiFi 802.11a/b/g/n, NFC, Bluetooth) ports.

The display 140 displays various kinds of information which is provided from the electronic apparatus 100. Specifically, the display 140 may display a user interface window for selecting various kinds of information that the electronic apparatus 100 provides. Specifically, the corresponding user interface window may select the trained model for performing optimization or may include an item for receiving parameters to be used for the optimization process.

The display 140 may be a monitor such as an LCD, a CRT, and an OLED and may be implemented in a touch screen which may simultaneously carry out a function of the manipulation input 150 to be described below.

In addition, the display 140 may display information on test results using the trained model. For example, if the corresponding trained model was a model for classifying images, the display 140 may display the classification results for the input images.

The manipulation input unit 150 may receive learning data to be optimized from a user and various parameters to be performed in the optimization process.

The manipulation input unit 150 may be implemented as a plurality of buttons, a keyboard, a mouse, and the like and may also be implemented as the touch screen which may simultaneously perform the function of the display 140 described above.

Meanwhile, it is described with reference to FIGS. 1 and 2 that the electronic apparatus 100 includes only one processor. However, the electronic apparatus may include a plurality of processors. A GPU as well as a general CPU may be used. Specifically, the above-described optimization operation may be performed using a plurality of GPUs.

Hereinafter, the reason why the optimization of the trained model as described above is possible will be described in detail.

As the number of image classification tasks is increased, the semantically similar classes may be divided into the split groups using only the same kind of features.

For example, features used to classify animals such as dogs and cats may differ from high-level features used to classify objects into classes such as trucks and planes. However, low-level features such as dots, stripes, and colors may be available in all classes.

In this regard, the lower layer in the artificial neural network is commonly used for all groups, and as it goes up to the higher layer, the features can be operated more efficiently with a tree-like structure that is split depending on the group of classes that are semantically classified. That is, this means that classes may be clustered into mutually exclusive groups depending on the function.

Through the clustering, the artificial neural network not only uses fewer parameters but also enables model parallelization that allows each group to be performed by different arithmetic units.

However, performance degradation may occur when each layer configuring the artificial neural network is split into an arbitrary group, that is, when semantically similar classes and features are not grouped to each other.

Accordingly, in the present disclosure, the input and output in each layer of the artificial neural network are divided into semantically related groups and the layer is divided vertically based on this, thereby reducing the amount of computation and the amount of parameters without the degradation in performance. Also, the model parallelization is possible based on this.

To this end, in the present disclosure, the input/output of each layer is grouped into groups that are semantically related to each other, and an operation of removing a portion corresponding to the inter-group connection in the matrix values of the parameters of the layer is performed.

For this operation, a split variable for assigning the input/output of each layer to the group is newly introduced, and an additional regularizing function for automatically dividing the semantically similar input/output into groups and suppressing the inter-group connection is introduced, thereby splitting the layer.

Figure 3:
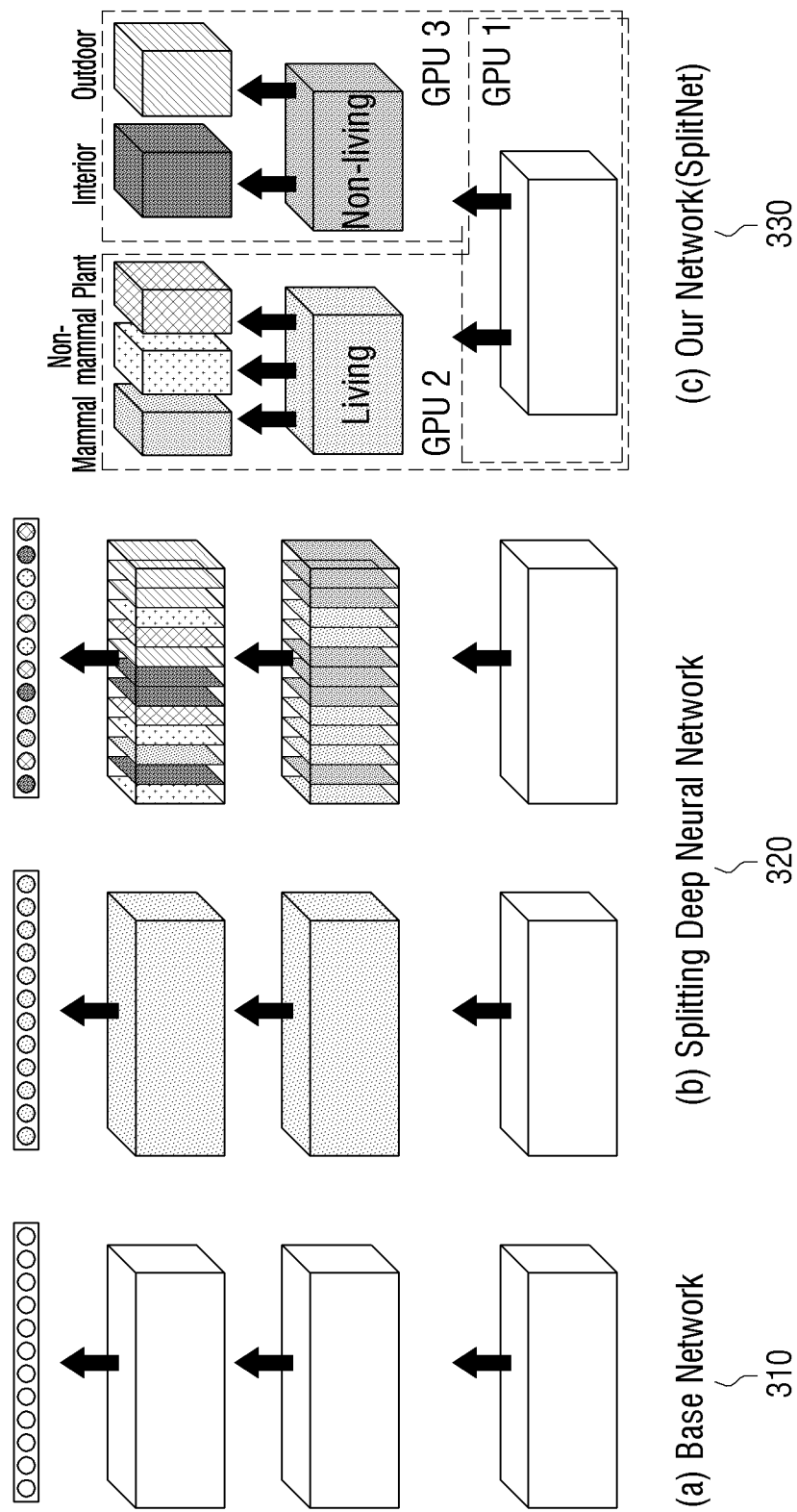
FIG. 3 is a diagram for explaining a tree structure network.

FIG. 3 is a diagram for explaining a tree structure network.

Referring to FIG. 3, a base trained model 310 consists of a plurality of layers.

To split the plurality of layers, the network weights such as class-to-group assignment and feature-to-group assignment are optimized. Specifically, the split variables for the input/output nodes of one layer configuring the base trained model 310 is introduced, and the loss function for the original task is minimized by the learning data of the task, and three kinds of additional regularization terms are introduced, thereby minimizing a sum thereof.

Based on this result, it is possible to determine to which group each node belongs, and to generate an optimized trained model 330 based on the determination.

Given a base network, the ultimate goal of this disclosure is to obtain a tree structure network that includes a set of subnetworks or layers associated with a particular class group, such as the optimized trained model 330 of FIG. 3.

Grouping heterogeneous classes may learn duplication functions on multiple groups, and consequently the network capacity may be wasted. As a result, according to an optimization method for splitting a class, the classes within each group should share many functions as possible.

Accordingly, to maximize the usability of the split, it is necessary to clusters the classes so that each group uses a subset of functions that are completely different from those used by other groups.

The most direct way to obtain these mutually exclusive class groups uses semantic classification because similar classes can share features. However, practically, these semantic classifications are not available or may not match the actual hierarchical group depending on the functions used in each class.

Another approach is to perform clustering (hierarchically) on the weights learned in the original network. This approach is also based on the use of actual functions. However, this approach is likely to duplicate the groups and should learn the network twice, and therefore which is inefficient and the clustered groups may not be optimized.

Therefore, hereinafter, a way to exclusively assign each class and feature to the split groups, and a way to use the network weights simultaneously in the deep learning framework will be described below.

Hereinafter, it is assumed that the data set is $\mathcal{D}=\{x_i, y_i\}_{i=1}^{N}$. Here $x_i \in \mathbb{R}^d$ represents an input data instance, and $y_i \in \{1, \ldots K\}$ represents a class level for a K class.

Learning in the artificial neural network is to learn a network having (weights $W^{(l)}$ in each layer 1. Here, $W^{(l)}$ represents a block-diagonal matrix, and each $W^{(l)}$ is associated with a class group $g \in \mathcal{G}$. Here, $\mathcal{G}$ represents a set of all groups.

This block-diagonal ensures that each split group of the classes has a unique function associated not to use other groups and the corresponding function. Accordingly, the network may be split into a plurality of class groups for fast computation and parallel processing.

To obtain this block-diagonal weight matrix $W^{(l)}$, the present disclosure uses a new split algorithm that learns the feature-group and class-group assignments in addition to the network weights. This split algorithm is referred to below as splitNet (or deep split).

First, a method for splitting a parameter used in a softmax classifier will be described first, and a method for applying it to a DNN will be described later.

$p_{gi}$ is a binary variable indicating whether feature i is assigned to group g, and $q_{gj}$ is a binary variable indicating whether class j is assigned to group g.

$p_g \in \mathbb{Z}_2^D$ is defined as a feature group assignment vector for the group g. Here, $\mathbb{Z}_2=\{0, 1\}$, D is a dimension of the feature.

Similarly, $q_g \in \mathbb{Z}_2^K$ is defined as a class group assignment vector for the group g. That is, $p_g$ and $q_g$ define the group g together. Here, $p_g$ represents a feature order associated with the group, and $q_g$ represents the class set assigned to the group.

It is assumed that there is no duplication between groups among the features or the classes. For example, $\Sigma_g p_g = 1_D$, that is, $\Sigma_g q_g = 1K$. Here, $1_D$ and $1_K$ all are vectors having one element.

This assumption gives stringent rules for the group assignment, whereas since each class is assigned to the group, and each group depends on a split subset of the features, the weight matrix may be classified into the block-diagonal matrix. This greatly reduces the number of parameters, and at the same time the multiplication $W^T x_i$ may be smaller and may be decomposed into fast block matrix multiplications.

The objective function to be optimized in the present disclosure can be defined as the following Equation 1.

$$\min_{w,P,Q} \mathcal{L}(w, X, y) + \sum_{l=1}^{L} \lambda \|W^{(l)}\|_2^2 + \sum_{l=S}^{L} \Omega(W^{(l)}, P^{(l)}, Q^{(l)}) \quad \text{[Equation 1]}$$

In the above Equation 1, $\mathcal{L}(W, X, y)$ represents a cross entropy loss of the learning data, W represents a weight tensor, P and Q represents the feature-group and class-group assignment matrices, $\|W\|_2^2$ represents a weight decay regularization term with hyperparameter $\lambda$, and $\Omega(W^{(l)}, P^{(l)}, Q^{(l)}$, represents a regularization term for the network split.

Hereinafter, a newly introduced regularization term $\Omega$ will be described in order to find the group assignment that is automatically split without the external semantic information.

The purpose of the above Equation 1 is to optimally commonly use a gradient descent, a start of full weight matrices for each layer, and an unknown group assignment for each weight.

By optimizing the cross entropy loss and the group regularization together, it is possible to automatically obtain the appropriate grouping and eliminate the inter-group concatenation.

Once the grouping is learned, the weight matrix may be explicitly split into the block-diagonal matrices to reduce the number of parameters, which allows much faster inference. Hereinafter, it is assumed that the number of groups (G) for separating each layer is given.

Hereinafter, a method of splitting a weight matrix for a layer into a plurality of groups will be described with reference to FIG. 4.

Figure 4:
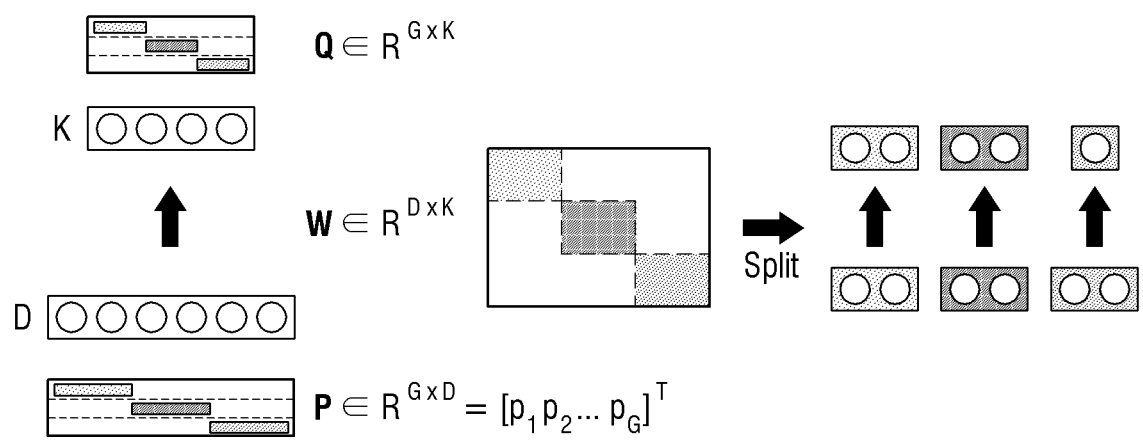
FIG. 4 is a diagram for explaining a group assignment and a group weight regularization operation.
Figure 5:
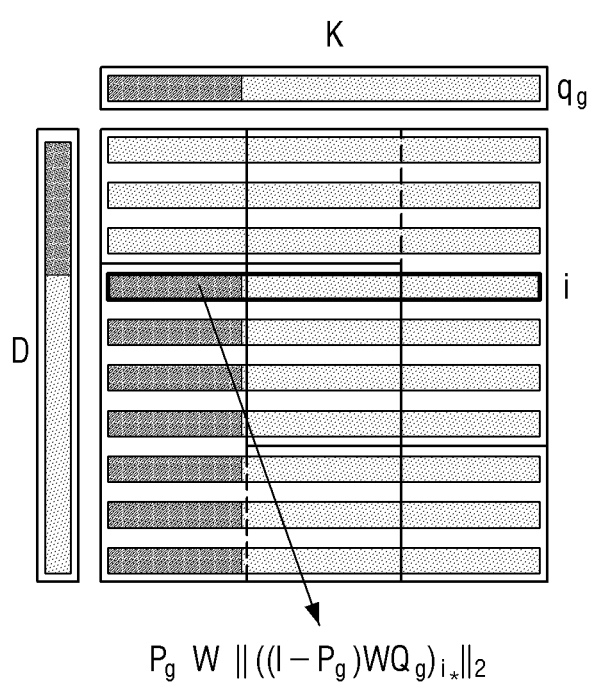
FIG. 5 is a diagram visualizing a weight to which regularization is applied.

FIG. 4 is a diagram for explaining a group assignment and a group weight regularization operation, and FIG. 5 is a diagram illustrating a weight to which the regularization is applied.

Referring to FIG. 4, the regularization for assigning the features and the classes to the plurality of groups may be expressed by the following Equation 2.

$$\Omega(W,P,Q)=\gamma_1 R_W(W,P,Q)+\gamma_2 R_D(P,Q)+\gamma_3 R_E(P,Q) \quad \text{[Equation 2]}$$

In the above Equation 2, $\gamma_1, \gamma_2, \gamma_3$ each are parameters that adjust a targeted strength. These parameters may be received from the user.

The first $R_W$ is the group weight regularization term, which is defined as (2, 1)—norm of parameters for the inter-group connections. Minimizing the corresponding term suppresses the inter-group connection and activates only the intra-group connection. The $R_W$ will be described later in more detail.

The second $R_D$ is a disjoint group assignment, which is a term which performs internally exclusively splitting between split variables. The $R_D$ will be described later in more detail.

The third $R_E$ is a balanced group assignment, and is defined as a square of a sum of each split variable and is a term which prevents a size of one group from excessively increasing. The $R_E$ will be described later in more detail.

Hereinafter, the first $R_W$ regularization will be described first.

The feature-group assignment matrix and the class-group assignment matrix each are assumed to be $P_g=\text{diag}(p_g)$ and $Q_g=\mathrm{diag}(q_g)$. Then, $P_g W Q_g$ represents a weight parameter associated with the group g (e.g., a connection within a group of functions and classes).

In order to obtain the block-diagonal weight matrix, the inter-group connection should be removed, and the inter-group connection is preferentially regularized. This regularization may be expressed by the following equation 3.

$$R_W(W, P, Q) = \sum_g \sum_i \|((I - P_g)WQ_g))_{i*}\|^2 + \quad \text{[Equation 3]}$$
$$\sum_g \sum_j \|(P_g W(I - Q_g))_{*j}\|_2$$

In the above Equation 3, $(W)_{i*}$ and $(W)_{*j}$ represent an i-th matrix and a j-th matrix of the weight W.

The above-described Equation 3 imposes a row/column-direction ($\ell$ 2, 1)—norm in the inter-group connection. FIG. 5 illustrates this regularization. Referring to FIG. 5, the weighted portion to which the regularization is applied is represented in a different color from the other regions.

The regularization in this manner yields a group quite similar to the semantic group. It is to be noted that the same initialization is avoided upon the grouping assignment. For example, if pi=1/G, the row/column-direction ($\ell$ 2, 1)—nom is reduced in purpose, and some row/column weight vectors may disappear before the group assignment.

Hereinafter, the second RD regularization will be described.

To easily handle numerical optimization, first, the $p_{gi}$ and $q_{gj}$ which are the binary variables are relieved to have the actual value within [0, 1] interval by using constraints $\Sigma_g p_g = \mathbb{1}_D$ and $\Sigma_g q_g = \mathbb{1}_K$. This sum-to-one constraint may be optimized using a reduced gradient algorithm that yields a sparse solution.

Alternatively, the $p_{gi}$ and the $q_{gj}$ may be re-parameterized with softmax type independent variables $\alpha_{gi}$, $\beta_{gj}$ as the following Equation 4 to perform the soft assignment.

$$p_{gi} = e^{\alpha_{gi}} / \sum_g e^{\alpha_{gi}}, q_{gj} = e^{\beta_{gj}} / \sum_g e^{\beta_{gj}}. \quad \text{[Equation 4]}$$

Of the two approaches, the softmax type may achieve more semantically meaningful grouping. On the other hand, the optimization of the sum-to-one constraint often leads to faster convergence than the softmax type.

In order for the group assignment vectors to be completely mutually exclusive, each group should be orthogonal. For example, $p_i \cdot p_j = 0$ and $q_i \cdot q_j = 0$ should be satisfied under the condition that i and j are different from each other. The orthogonal regularization term that satisfies this is expressed by the following Equation 5.

$$R_D(P, Q) = \sum_{i<j} p_i \cdot p_j + \sum_{i<j} q_i \cdot q_j \quad \text{[Equation 5]}$$

Here, the inequality may avoid the duplicated inner product. Specifically, since the dimensions of pi and qi may be different, cosine similarity between the group assignment vectors may be minimized. However, in the sum-to-one constraint and the sparsity that leads to the regularization, the group assignment vector has a similar scale and the cosine similarity decreases to the inner similarity.

There are some notes in minimizing the inner product between the group assignment vectors. First, the number of inner products is adjusted to a second-order formula along with the number of groups. Second, if the value of the group assignment vector is uniformly initialized, the gradient may be close to zero, which slows down the optimization process. For example, minimizing $\alpha_1 \cdot \alpha_2$ in $\alpha_1, \alpha_2 \in \mathbb{R}$ having a limitation of $\alpha_1 + \alpha_2 = 1$ is the same as minimizing $\alpha_1 \cdot (1 - \alpha_1)$. If the initialization is performed at 0.5, the gradient is close to zero.

Hereinafter, the third $R_E$ regularization will be described.

In the group split using only the above Equation 5, one split group may be superior to other all groups. In other words, one group includes all the functions and classes, but other groups may not include all the functions and classes.

Therefore, the group assignment may be limited to be balanced by regularizing the sum of squares of elements in each group assignment vector as the following Equation 6.

$$R_E(P, Q) = \sum_g \left( \left( \sum_i p_{gi} \right)^2 + \left( \sum_j q_{gj} \right)^2 \right) \quad \text{[Equation 6]}$$

The above Equation 5 is minimized when the sum of the elements of each group assignment vector is an even number due to the constraints of $\Sigma_g p_g = \mathbb{1}^D$ and $\Sigma_g q_g = \mathbb{1}^K$. For example, each group may have the same number of elements. Since the dimensions of the feature and class group assignment vectors may be different, the ratios of the two conditions are adjusted to an appropriate weight. For example, when using batch regularization followed by the group weight regularization, the weights tend to decrease in size while a scale parameter of a BN layer increases. In order to avoid this effect, it is possible to use the $\ell_2$ regularization weight $W/\|W\|_2$ in place of the W within the $R_W$ or simply deactivate the scale parameter of the BN layer.

The effect of balanced group regularization will be described later with reference to FIG. 10.

Hereinafter, a method of applying the above-described objective function to a deep neural network will be described.

The weight split method described above may be applied to the deep neural network (DNN). First, it is assumed that $W^{(l)}$ represents a weight of a primary ($1 \leq l \leq L$) layer, and L is the total number of layers of the DNN.

The deep neural network may include two types of layers: (1) an input and hidden layer that generates a feature vector for a given input, and (2) an output fully connected (FC) layer that yields softmax classifier class probabilities.

For the weights for the output fully connected (FC) layer, the output fully connected (FC) layer may be split by applying the split method described above as it is. The method of the present disclosure can also be extended to multiple continuous layers or iterative hierarchical group assignments.

In the deep neural network, the lower-level layer learns the base representation, and the base representations may be shared in all classes. Conversely, the high-level representations are highly likely to apply only to specific groups of learners.

Accordingly, for the split for the natural deep neural network, an I-th layer is first split and an S-th layer ($S \leq l$) is gradually split, in the state in which the lower layers (I<S) are maintained to be shared between the class groups.

Each layer includes an input node and an output node, and the input node and the output node have the weight $W^{(l)}$ representing the connection to each other. $p_g^{(l)}$ and $q_g^{(l)}$ are the feature group assignment vector and the class group assignment vector for a history node and an output node of the l-th layer. In this regard, $P_g^{(l)} W^{(l)} Q_g^{(l)}$ represents the connection within the group for the group g within the layer I.

Since the output node of the previous layer correspond to the input node of the next layer, the group assignment may be shared as $q_g^{(l)} = p_g^{(l+1)}$. As a result, the signals are not delivered to different layer groups, and therefore forward and reverse propagation in each group becomes independent of the processing of other groups. Accordingly, the computations for each group may be split and processed in parallel. To this end, the above-described $q_g^{(l)} = p_g^{(l+1)}$ may impose on all the layers.

The softmax computation at the output layer includes regularization for all classes that need to compute a logit for the group. However, it is sufficient to identify the class having the largest logit in progress. The classes having the largest logit in each group may be determined independently, and the computation of the maximum value of the classes requires only minimal communication and computation. Therefore, except for the softmax computation for the output layer, the computations for each group may be decomposed and processed in parallel.

The objective function applied to the deep neural network is the same as Equations 1 and 2 described above, except that it has the number L of $P^{(l)}$ and $Q^{(l)}$ for each layer. That is, since the proposed group split method is similar to the convolution filter method, it can be applied to the CNN. For example, if the weight of the convolution layer is 4D tensor ($W_C \in \mathbb{R}^{M \times N \times D \times K}$, where M and N are the height and width of each field, and D and K are the number of input convolution filters and the number of output convolution filters). The above-described group-$\ell$ 2,1-norm may be applied to the dimensions of the input and output filters. Then, the 4-D weight tensor We can be reduced to a 2-D matrix $W_C^l \in \mathbb{R}^{D \times K}$ using the following Equation 7.

$$W_e' = \{w_{dk}'\} = \left\{ \sqrt{\sum_{m,n} w_{mndk}^2} \right\}.$$ [Equation 7]

Next, the weight regularization for the convolution weight may be obtained by applying the above Equation 7 to the above Equation 5 described above.

In addition, the method of the present disclosure can also be applicable to the residual network by sharing group assignment via nodes connected by a shortcut connection. Specifically, the residual network considers the fact that the two convolution layers are bypassed by the short-cut connection.

$W^{(l_1)}$ It is assumed that $W^{(l_1)}$ and $W^{(l_2)}$ represent the weight of the convolutional layer, and $p_g^{l_1}, q_g^{l_1}, p_g^{l_2}, q_g^{l_2}$ represents the group assignment vectors for each layer having $q_g^{(l_1)} = p_g^{(l_2)}$. Since the short identity mapping links the input nodes of the first convolution layer to the output nodes of the second convolution layer, the grouping of these nodes may be shared, like $p_g^{(l_1)} = q_g^{(l_2)}$.

Hereinafter, the hierarchical grouping will be described.

The semantic layer of classes often exists. For example, dog and cat groups are subgroups of mammals. In this regard, the above-described deep split may be extended to obtain the multi-layered hierarchical structure of the categories. For the sake of simplicity, two tree layers including the set of subgroups may be considered for a super group, which is easy to extend into a hierarchy having an arbitrary depth.

It is assumed that the grouping branch at the l-th layer and the output node of the l-th layer is assumed to be grouped into a G super group assignment vector $q_g^{(l)}$ having $$\sum_g q_g^{(l)} = \mathbb{1}_D.$$

In the next layer, it is assumed that there is each subgroup g=1, . . . , G corresponding to the subgroup assignment vector $p_{gs}^{(l+1)}$ having $\Sigma_{s,g} p_{gs}^{(l+1)} = \mathbb{1}_D$. As described above, the input node of the (l+1)-th layer corresponds to the output node of the l-th layer. Accordingly, $p_g^{(l+1)} = \Sigma_s p_{gs}^{(l+1)}$ may be defined, and the mapping to the supper group assignment corresponding to the subgroup group assignment may be mapped. Next, like the deep split, the constraint of $p_g^{(l+1)} = \Sigma_s p_{gs}^{(l+1)}$ is added.

Meanwhile, one way to build such a structure in the CNN is to branch each group into two subgroups when the number of convolution filters doubles.

Hereinafter, the parallelization of the splitNet will be described.

The method according to the present disclosure may create the tree structure network that is a sub-network in which there is no inter-group connection. These results enable the model parallelization by assigning each of the obtained subnetworks to each processor. This can be implemented only by the operation of assigning only the lower layer and the higher layer per group to each node.

The test time for the lower layer is not changed, and even if unnecessary duplication computation occurs, this method becomes acceptable. It is also possible to parallelize the learning time.

Figure 6:
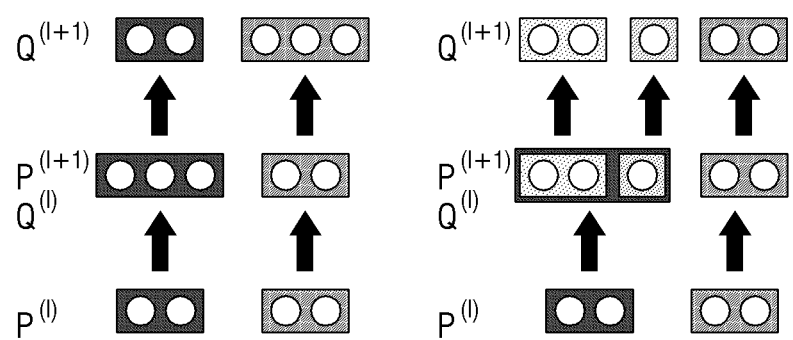
FIG. 6 is a diagram showing a split algorithm of a trained model of the present disclosure.

FIG. 6 is a diagram showing a split algorithm of a trained model of the present disclosure, FIG. 7 is a diagram showing an example of a case in which an output of one group is split.

Referring to FIG. 6, the neural network parameters may be the pretrained neural network parameters or may be initialized randomly, and the split variable may be initialized to be close the uniform (1/G) value.

Next, the stochastic gradient descent method optimizes the values of the parameters and the split variables of the neural network in the direction in which the loss function for the task and the weight decay regularization are minimized together with the above-described regularization term.

The split variable thus optimized converges to a value of 0 or 1 depending on which group nodes of each layer belong to, and the inter-group connection of the neural network parameters is almost suppressed and becomes a block-diagonal matrix when rearranged depending on the split variables. Here, if each block of the parameter matrix corresponds to the connections in each group, the inter-group connection is lost.

Accordingly, as shown in FIG. 7, the layers can be vertically divided into a plurality of layers according to the group, and the diagonal blocks of the parameter matrix may be split into a plurality of layers using the parameters of the divided layers.

Specifically, the input and output of one layer may be vertically split by being divided into each group through the above-mentioned regularization function. If the split variables are shared so that the output of one group of one layer leads to the input of the corresponding group of the next layer, the groups are split across the layers by applying this to multiple successive layers, the groups are divided over several layers without the inter-group connection. In addition, if the split variables are shared to divide the output of one group into several outputs of the next layer, the neural network finally made has the structure in which the groups are branched.

Finally, the parameters are finely adjusted by the task loss function and the weight decay regularization to finally obtain the tree-like neural network.

Hereinafter, the effect of the optimization method according to the present disclosure will be described with reference to FIGS. 8 to 15.

The experimental conditions applied to the optimization method according to the present disclosure will be described first.

According to the experiment results of FIGS. 8 to 15, the image classification is performed using two sets of bench data as described below.

The first is CIFAR-100. The CIFAR-100 data set includes 32×32 pixel images for 100 common object classifications, in which each classification includes 100 images for learning and 100 images for test. In this experiment, 50 images for each classification were used separately as a validation set for cross verification.

The second is ImageNet-1K. The ImageNet-1K data set includes 1.2 million images for 1000 common object classifications. For each classification, there are 1 to 1.300 images for learning and 50 images for testing according to standard procedures.

To compare several methods for the grouping, five classification models were used.

The first is the base network, which is a common network including the entire network weight. A wide residual network (WRN), one of the most advanced networks of data sets, was used for the experiments on the CIFAR-100. As the base network of ILSVRC2012, AlexNet and ResNet-18 were used.

The second is SplitNet-Semantic. This is a modification of the SplitNet described above that obtains a class classification from the semantic classification provided by the data set. Before the learning, the network is split according to the classification scheme to equally split the layer and the subnetworks are assigned to each group, and then the learning proceeds from the beginning.

The third is SplitNet-Clustering. This is a modification of the second method, in which the class is split by hierarchical spectral clustering of a pretrained base network.

The fourth is SplitNet-Random. This is a modification using arbitrary class split.

The fifth is SplitNet. The SplitNet is a method of automatically splitting and using the weight matrix as described above.

Figure 8:
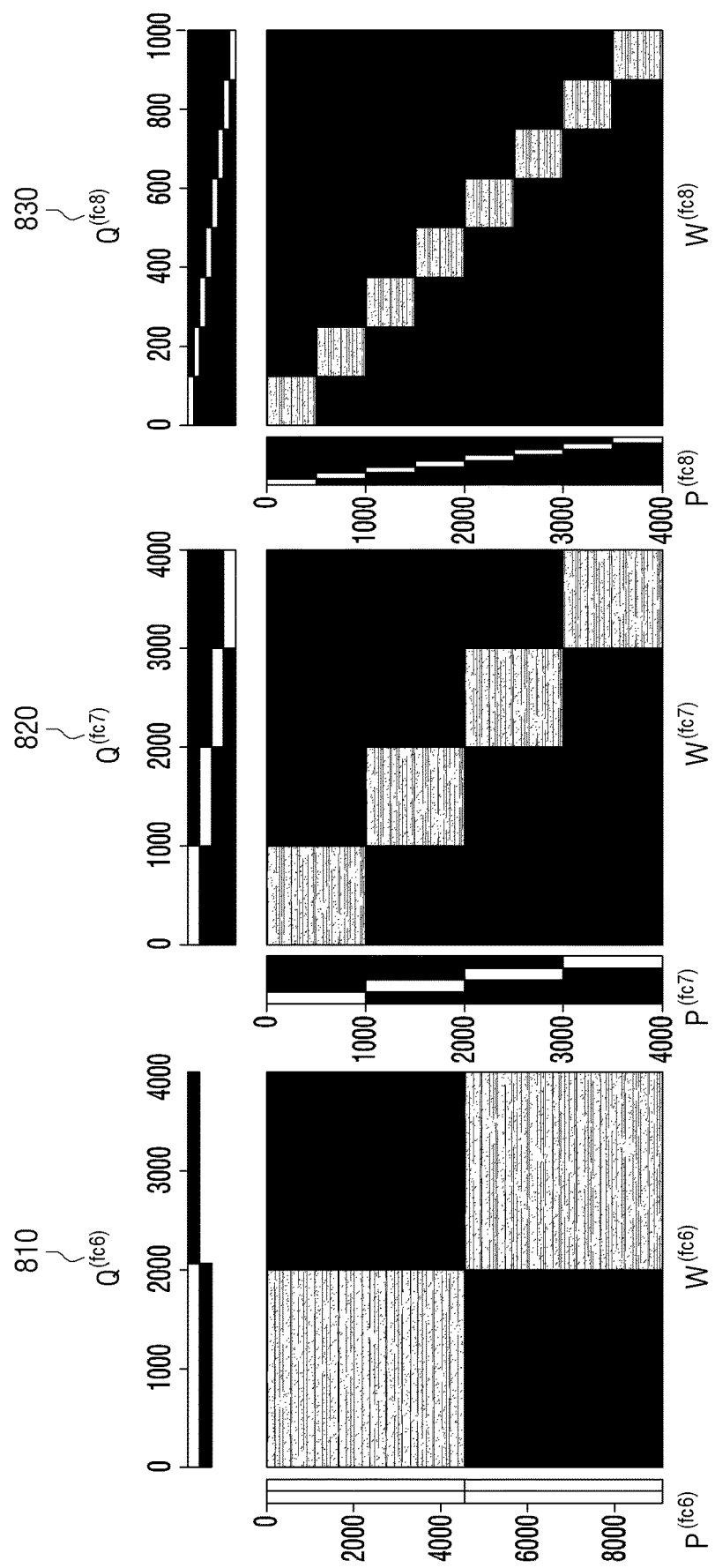
FIG. 8 is a diagram showing an example of an optimization result for successive three high layers.

FIG. 8 is a diagram showing an example of an optimization result for successive three high layers; Specifically, FIG. 8 shows that when the image classification task of the ImageNet data set of the Alexnet, which is a type of the deep neural network, is applied to the successive three high layers FC6, FC7, and FC8 while being learned, the second step shows the result of optimizing the split variables with the neural network parameters (the order of the values is the rearrangement of rows and columns depending on the value of the split variable).

In FIG. 8, black indicates that the value is 0, white indicates that the value is positive. In this case, it may be confirmed that the respective intra-group connection is activated (the diagonal block is positive) in the parameter matrix and the inter-group connection is suppressed.

That is, it shows how the split variables P,Q and the parameter W are split by the method according to the present disclosure, and it may be confirmed that each layer of the deep neural network has the hierarchical structure.

FIG. 9 is a diagram showing a benchmark of a trained model to which an optimization method is applied. Specifically, FIG. 9 summarizes runtime performance using the model parallelization in the SplitNets.

Referring to FIG. 9, it may be confirmed that by optimizing the DNN, it is possible to increase the speed by not only reducing the parameters but also utilizing the split structure for the model parallelization.

On the other hand, a natural way for the model parallelization is to assign each split group and a shared lower layer to each GPU. The duplicate computation occurs, but at the same time it is secured there is no communication required between the GPUs. As a result, it may be confirmed that the speed increases up to 1:44.

Figure 10:
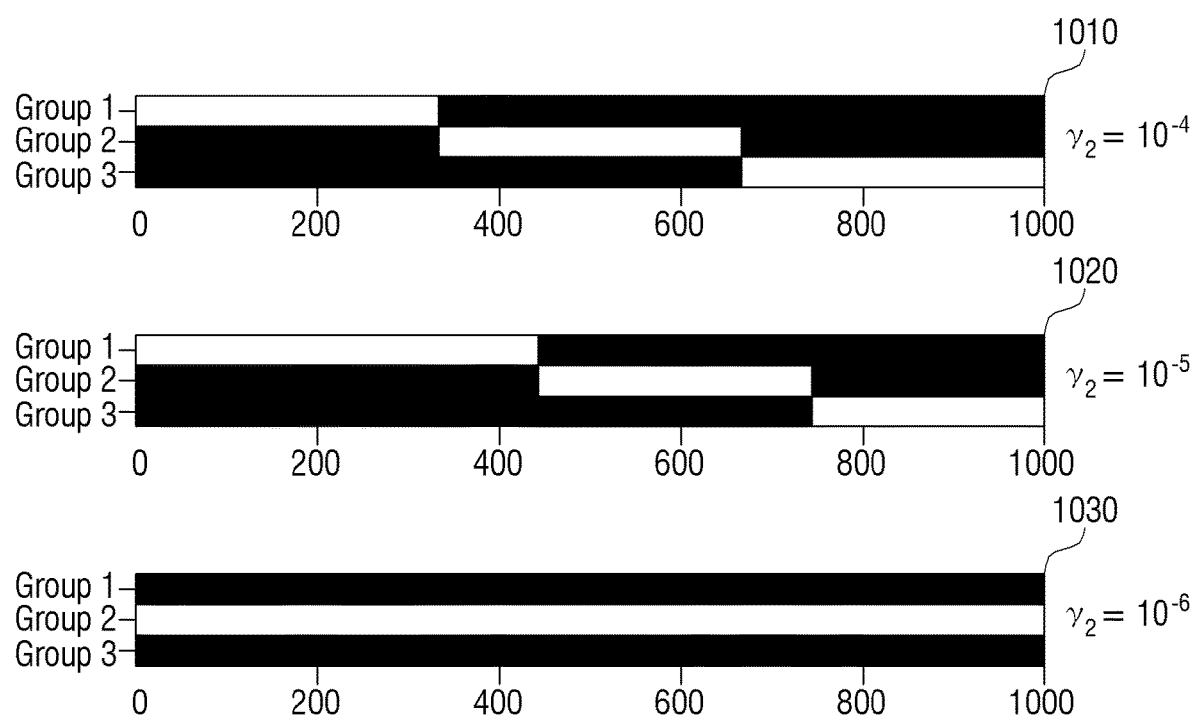
FIG. 10 is a diagram showing an effect of balance group regularization.

FIG. 10 is a diagram showing the effect of balanced group regularization.

Referring to FIG. 10, since the size of the group is uniform due to a sufficiently large regularization, it is preferable for the parameter reduction and the model parallelization of the SplitNet.

By relieving this regularization, the flexibility imposes on individual group sizes. $\gamma_3$ If $\gamma_3$ is set to be too low, all classes and functions are grouped into a single group, which leads to a trivial solution. In this regard, it is preferable to balance all groups of models for the network reduction and the parallelization in the experiment.

FIG. 11 is a diagram showing test errors for each of the various algorithm schemes for the CIFAR-100 data set, and FIG. 12 is a diagram showing a comparison of the parameter (or computation) reduction and the test error in the CIFAR-100 data set.

Referring to FIG. 11, it may be confirmed that the SplitNet modification using the semantic classification method providing the data set (−S) and the spectrum clustering (−C) is superior to arbitrary grouping (−R) and the grouping appropriate for the DNN segmentation is important.

In particular, it may be confirmed that applying the SplitNet is superior to all the modifications. The SplitNet has an advantage in that like the semantic or clustering split, the additional semantic information or the pre-computed network weight is not required.

Referring to FIG. 12, it may be confirmed that the FC split is to minimize the parameter reduction due to the large number of filters. On the other hand, it may be confirmed that Shallow Split including 5 convolution layers reduces the parameters of the network by 32.44% and the test accuracy is slightly improved.

It may be confirmed that the deep and hierarchical split further reduces the parameters and FLOP while sacrificing the slight accuracy degradation.

The shallow split has far fewer parameters and thus has performance far better than other algorithms. This is due to the fact that the SplitNet of the present disclosure starts from the entire network and learns and reduces unnecessary connections between different groups of internal layers to give the layer the regularization effect. In addition, the layer split may be considered as a form of the variable selection. Each group of layers may simply select only the required node group.

In conclusion, as a result of splitting six high layers while learning the image classification task of the CIFAR-100 data set of a wide residual network, which is one type of the deep neural network, it may be confirmed that the performance is increased by 0.3% while the number of parameters is reduced by 32% and the computation is reduced by 15%.

Figure 13:
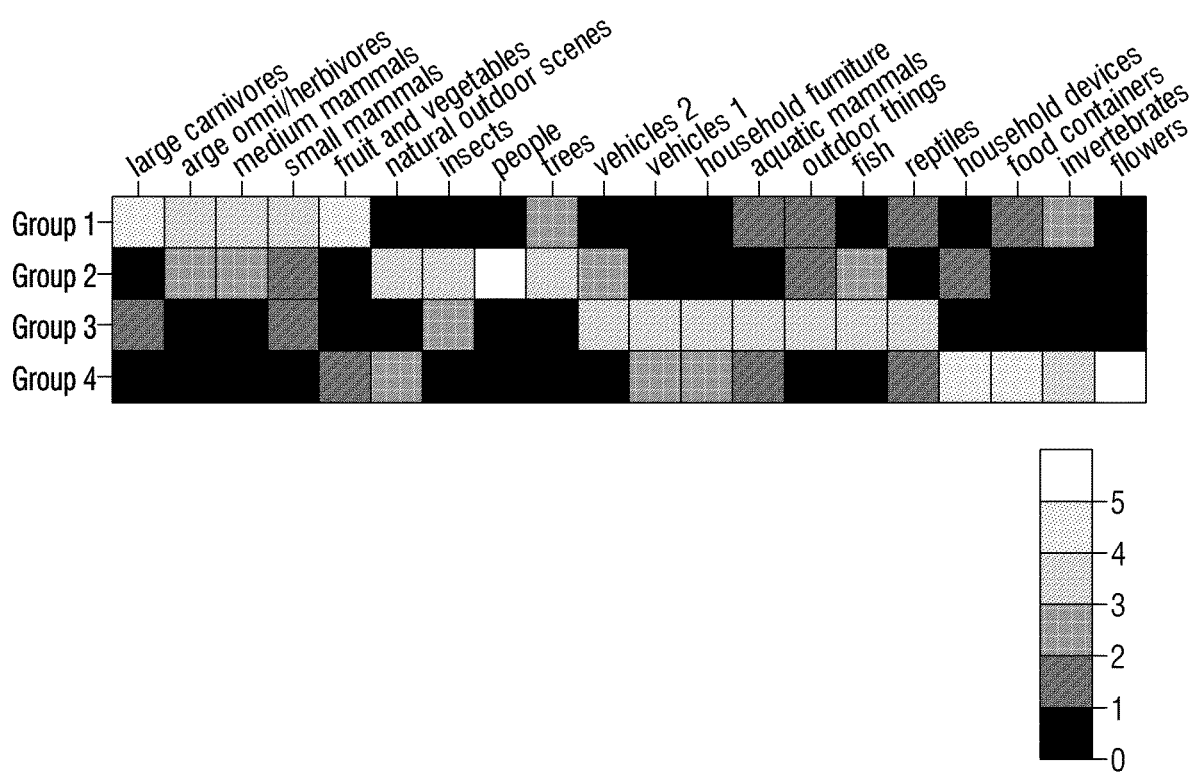
FIG. 13 is a diagram showing to which group subclasses of 20 high classes belong.

FIG. 13 is a diagram showing to which group subclasses of 20 high classes belong; Specifically, FIG. 13 compares a group designation learned in FC SplitNet (G=4) with a semantic category provided in CIFAR-100.

Referring to FIG. 13, A people category includes five classes: baby, boy, girl, male, and female. All of these classes are grouped into group 2 according to the algorithm according to the present disclosure. Three or more classes of all semantic categories are grouped together. As you can see in the figure, semantically similar high classes are grouped together.

FIGS. 14 and 15 are diagrams showing a comparison of a parameter (or computation) reduction and a test error in a set of ILSVRC2012 data.

Referring to FIGS. 14 and 15, it may be confirmed that the SplitNet uses the AlexNet as a base model to greatly reduce the number of parameters concentrated on the fc layer. However, it may be confirmed that most FLOPs is generated in a lower cony layer, and only a small FLOP reduction is brought.

On the other hand, it may be confirmed that the SplitNet of the AlexNet shows the minor test accuracy degradation due to the significant parameter reduction. On the other hand, the SplitNet, which is based on ResNet-18, may be confirmed to degrade the test accuracy as the split becomes deeper. In this regards, it is expected that splitting the ResNet-18 limits a width of up to 512 convolutional layers compared to many classes to damage the network capacity.

Nevertheless, it may be confirmed that our proposed SplitNet is superior to the SplitNet-Random in all experiments. Specifically, as a result of splitting six high layers while a network in which the number of filters of the layer of the ResNet-18, which is one kind of the deep neural network, is doubled from the existing N numbers to M numbers learns the image classification task of the ImageNet data set, it may be confirmed that the performance is increased by 0.1% p on average while the number of parameters is reduced by 38% and the computation is reduced by 12%.

Figure 16:
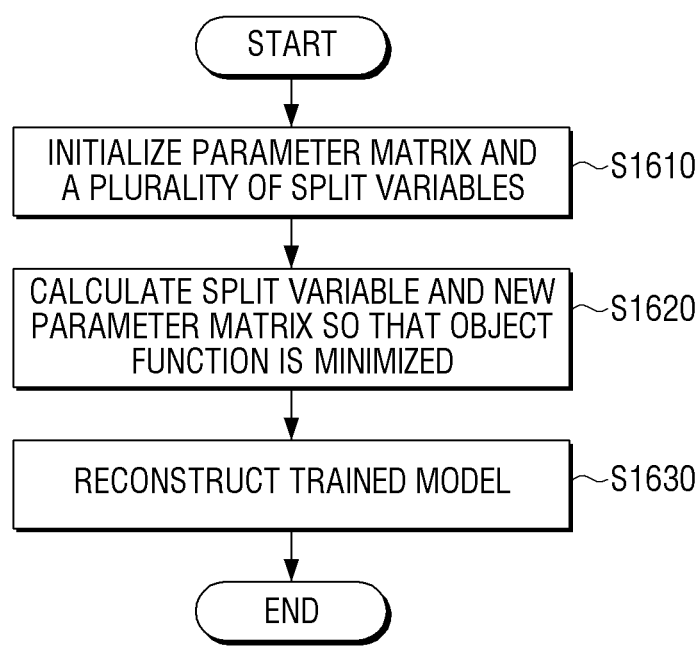
FIG. 16 is a flow chart for explaining a method for optimizing a trained model according to an exemplary embodiment of the present disclosure.

FIG. 16 is a flow chart for explaining a method for optimizing a trained model according to an exemplary embodiment of the present disclosure.

Referring to FIG. 16, first of all, the parameter matrix and the plurality of split variables of the trained model configured of the plurality of layers are initialized (S1610). Specifically, the parameter matrix may be initialized randomly, and the plurality of split variables may be initialized so as not to be uniform to each other.

The new parameter matrix having the block-diagonal matrix for the plurality of split variables and the trained model is calculated to minimize the loss function for the trained model, the weight decay regularization, and the objective function including the split regularization term defined by the parameter matrix and the plurality of split variables (S1620). At this time, the objective function as shown in the above Equation 1 using the stochastic gradient descent method may be minimized.

Here, the split regularization term includes the group weight regularization term that suppresses the inter-group connection and activates only the intra-group connection, the disjoint group assignment that makes each group be orthogonal to each other, and the balanced group assignment that prevents the size of one group from being excessive.

The plurality of layers are vertically split according to the group based on the computed split parameters and the trained model is reconstructed using the computed new parameter matrix as the parameters of the vertically split layers.

After the reconstruction, the second-order new parameter matrix for the reconstructed trained model is computed to minimize the loss function for the trained model and a second objective function including only the weight decay regularization, and the computed second-order new parameter matrix is used as the parameters of the vertically split layer to optimize the trained model.

Therefore, in the method for optimizing a trained model according to the present embodiment, the trained models are clustered into groups in which classes match a set of exclusive functions. Since it is completely integrated into the network learning process using the objective function as the above Equation 1, the network weight and split may be simultaneously learned. According to the optimized trained model, a single trained model may be computed by being divided into multiple devices, and the number of computation and parameters may be reduced, such that it is possible to perform the computation even faster just by one device. The method for optimizing a trained model as illustrated in FIG. 16 may be executed on the electronic apparatus having the configuration of FIG. 1 or FIG. 2, or may be performed on an electronic apparatus having another configuration.

Further, the method for optimizing a trained model as described above may be implemented in programs including algorithm which may be executed in a computer and the programs may be provided while being stored in a non-transitory computer readable medium.

The non-transitory computer readable medium is not a medium that stores data therein for a while, such as a register, a cache, and a memory, but means a medium that semi-permanently stores data therein and is readable by a device. In detail, various applications or programs for performing various methods described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

Figure 17:
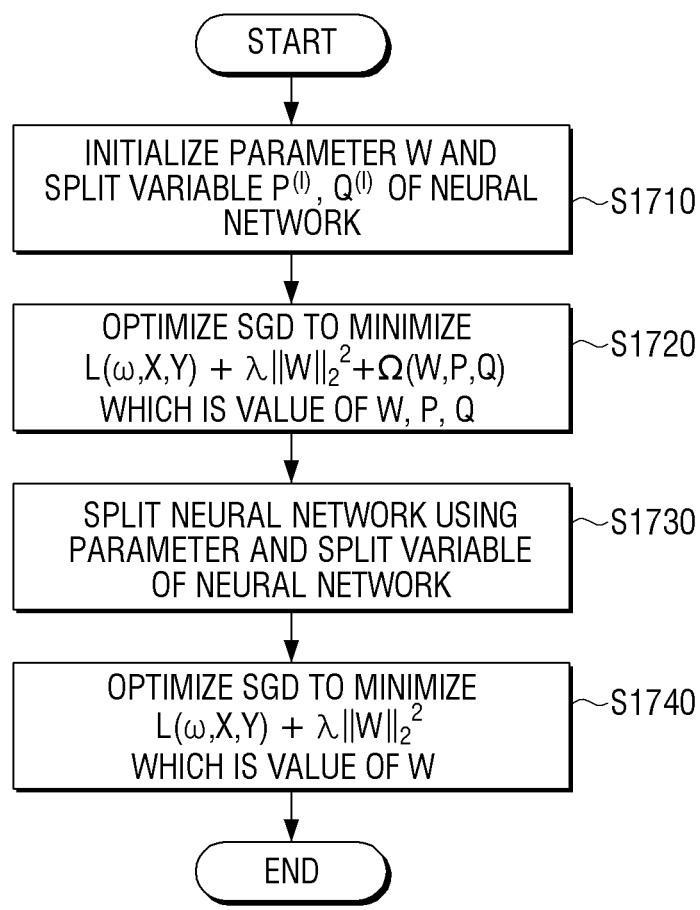
FIG. 17 is a flow chart for explaining a method for splitting a trained model according to an exemplary embodiment of the present disclosure.

FIG. 17 is a flow chart for explaining a method for splitting a trained model according to an exemplary embodiment of the present disclosure.

Referring to FIG. 17, the neural network parameters may be the pretrained neural network parameters or may be initialized randomly, and the split variable may be initialized to be close the uniform (1/G) value (S1710).

Next, the stochastic gradient descent method optimizes the values of the parameters and the split variables of the neural network in the direction in which the loss function for the task and the weight decay regularization are minimized together with the above-described regularization term (S1720).

The split variable thus optimized converges to a value of 0 or 1 depending on which group nodes of each layer belong to, and the inter-group connection of the neural network parameters is almost suppressed and becomes a block-diagonal matrix when rearranged depending on the split variables.

Next, the neural network may be split using the previously computed split variable (S1730).

Finally, the parameters are finely adjusted by the task loss function and the weight decay regularization to finally obtain the tree-like neural network (S1740).

Therefore, in the method for splitting a trained model according to the present embodiment, the trained models are clustered into groups in which classes match a set of exclusive functions. Since it is completely integrated into the network learning process using the objective function as the above Equation 1, the network weight and split may be simultaneously learned. The method for splitting a trained model as illustrated in FIG. 17 may be executed on the electronic apparatus having the configuration of FIG. 1 or FIG. 2, or may be performed on an electronic apparatus having another configuration.

Further, the method for splitting a trained model as described above may be implemented in programs including algorithm which may be executed in a computer and the programs may be provided while being stored in a non-transitory computer readable medium.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. A method for optimizing a trained model, the method comprising:
    initializing a parameter matrix and a plurality of split variables of a trained model configured of a plurality of layers;
    calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables;
    vertically splitting the plurality of layers according to a group based on computed split parameters; and
    reconstructing the trained model using the calculated new parameter matrix as parameters of the vertically split layers,
    wherein the split regularization term comprises a group weight regularization term that suppresses an inter-group connection and activates only an intra-group connection, a disjoint group assignment that makes each group be orthogonal to each other, and a balanced group assignment that regularizes against a difference between a size of one group and a size of another group.

2. The method as claimed in claim 1, wherein in the initializing, the parameter matrix is initialized randomly and the plurality of split variables are initialized not to be uniform to each other.

3. The method as claimed in claim 1, wherein in the computing, a stochastic gradient descent method is used so that the objective function is minimized.

4. The method as claimed in claim 1, further comprising:
    computing a second-order new parameter matrix for the reconstructed trained model to minimize the loss function for the trained model and a second objective function including only the weight decay regularization term, and
    optimizing the trained model using the computed second-order new parameter matrix as parameters of the vertically split layers.

5. The method as claimed in claim 4, further comprising: parallelizing each of the vertically split layers within the optimized trained model using different processors.

6. An electronic apparatus comprising:
    a memory configured to store a trained model configured of a plurality of layers; and
    a processor configured to:
        initialize a parameter matrix and a plurality of split variables of a trained model,
        calculate a new parameter matrix having a block-diagonal matrix for the plurality of split variables and the trained model to minimize a loss function for the trained model, a weight decay regularization term, and an objective function including a split regularization term defined by the parameter matrix and the plurality of split variables,
        vertically split the plurality of layers according to a group based on a computed split parameters, and
        reconstruct the trained model using the calculated new parameter matrix as parameters of the vertically split layers,
    wherein the split regularization term comprises a group weight regularization term that suppresses an inter-group connection and activates only an intra-group connection, a disjoint group assignment that makes each group be orthogonal to each other, and a balanced group assignment that regularizes against a difference between a size of one group and a size of another group.

7. The electronic apparatus as claimed in claim 6, wherein the processor is further configured to randomly initialize the parameter matrix and initializes the plurality of split variables not to be uniform to each other.

8. The electronic apparatus as claimed in claim 6, wherein the processor is further configured to use a stochastic gradient descent method to minimize the objective function.

9. The electronic apparatus as claimed in claim 6, wherein the processor is further configured to:
    compute the second-order new parameter matrix for the reconstructed trained model to minimize the loss function for the trained model and a second objective function including only the weight decay regularization, and
    optimize the trained model using the computed second-order new parameter matrix as parameters of the vertically split layers.

10. A non-transitory computer readable recording medium including a program for executing a method for optimizing a trained model in an electronic apparatus, wherein the method for optimizing a trained model includes:
    initializing a parameter matrix and a plurality of split variables of a trained model including a plurality of layers;
    calculating a new parameter matrix having a block-diagonal matrix for the plurality of split variables and the trained model to minimize a loss function for the trained model, a weight decay regularization term, and an objective function including a split regularization term defined by the parameter matrix and the plurality of split variables;
    vertically splitting the plurality of layers according to a group based on computed split parameters; and
    reconstructing the trained model using the calculated new parameter matrix as parameters of the vertically split layers,
    wherein the split regularization term comprises a group weight regularization term that suppresses an inter-group connection and activates only an intra-group connection, a disjoint group assignment that makes each group be orthogonal to each other, and a balanced group assignment that regularizes against a difference between a size of one group and a size of another group.

* * * * *